United States Patent
Lee et al.

(10) Patent No.: US 8,280,377 B2
(45) Date of Patent: Oct. 2, 2012

(54) METHOD OF PERFORMING CELL RESELECTION IN WIRELESS COMMUNICATION SYSTEM

(75) Inventors: Seon Don Lee, Seoul (KR); Young Dae Lee, Seoul (KR); Sung Duck Chun, Seoul (KR); Seung June Yi, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 12/678,964

(22) PCT Filed: Oct. 2, 2008

(86) PCT No.: PCT/KR2008/005835
§ 371 (c)(1),
(2), (4) Date: Mar. 18, 2010

(87) PCT Pub. No.: WO2009/045078
PCT Pub. Date: Apr. 9, 2009

(65) Prior Publication Data
US 2010/0240367 A1    Sep. 23, 2010

Related U.S. Application Data

(60) Provisional application No. 60/977,763, filed on Oct. 5, 2007, provisional application No. 60/988,073, filed on Nov. 14, 2007.

(30) Foreign Application Priority Data

Dec. 7, 2007 (KR) .................. 10-2007-0127016

(51) Int. Cl.
*H04Q 7/20* (2006.01)
(52) U.S. Cl. ............... 455/436; 455/550.1; 455/442; 370/329
(58) Field of Classification Search ............ 455/436, 455/550.1, 442; 370/331
See application file for complete search history.

(56) References Cited

U.S. PATENT DOCUMENTS

| | | | |
|---|---|---|---|
| 2004/0162074 A1* | 8/2004 | Chen | 455/437 |
| 2005/0090278 A1 | 4/2005 | Jeong et al. | |
| 2005/0143082 A1 | 6/2005 | Yang | |
| 2006/0084443 A1 | 4/2006 | Yeo et al. | |
| 2007/0265010 A1* | 11/2007 | Fujita et al. | 455/436 |
| 2008/0032695 A1* | 2/2008 | Zhu et al. | 455/442 |
| 2010/0074097 A1* | 3/2010 | Jeon et al. | 370/217 |

FOREIGN PATENT DOCUMENTS

| | | |
|---|---|---|
| KR | 10-2006-0046937 | 5/2006 |
| KR | 1020060099462 | 9/2006 |

* cited by examiner

*Primary Examiner* — Danh Le
(74) *Attorney, Agent, or Firm* — Lee, Hong, Degerman, Kang & Waimey

(57) ABSTRACT

A method of performing cell reselection includes receiving priority for a different frequency or RAT (Radio Access Technology) and information on a validity timer for the priority, starting the validity timer, performing cell reselection based on the priority while the validity timer is running, receiving reconfiguration information of the validity timer, and reconfiguring the validity timer based on the reconfiguration information.

12 Claims, 7 Drawing Sheets

[Fig. 1]
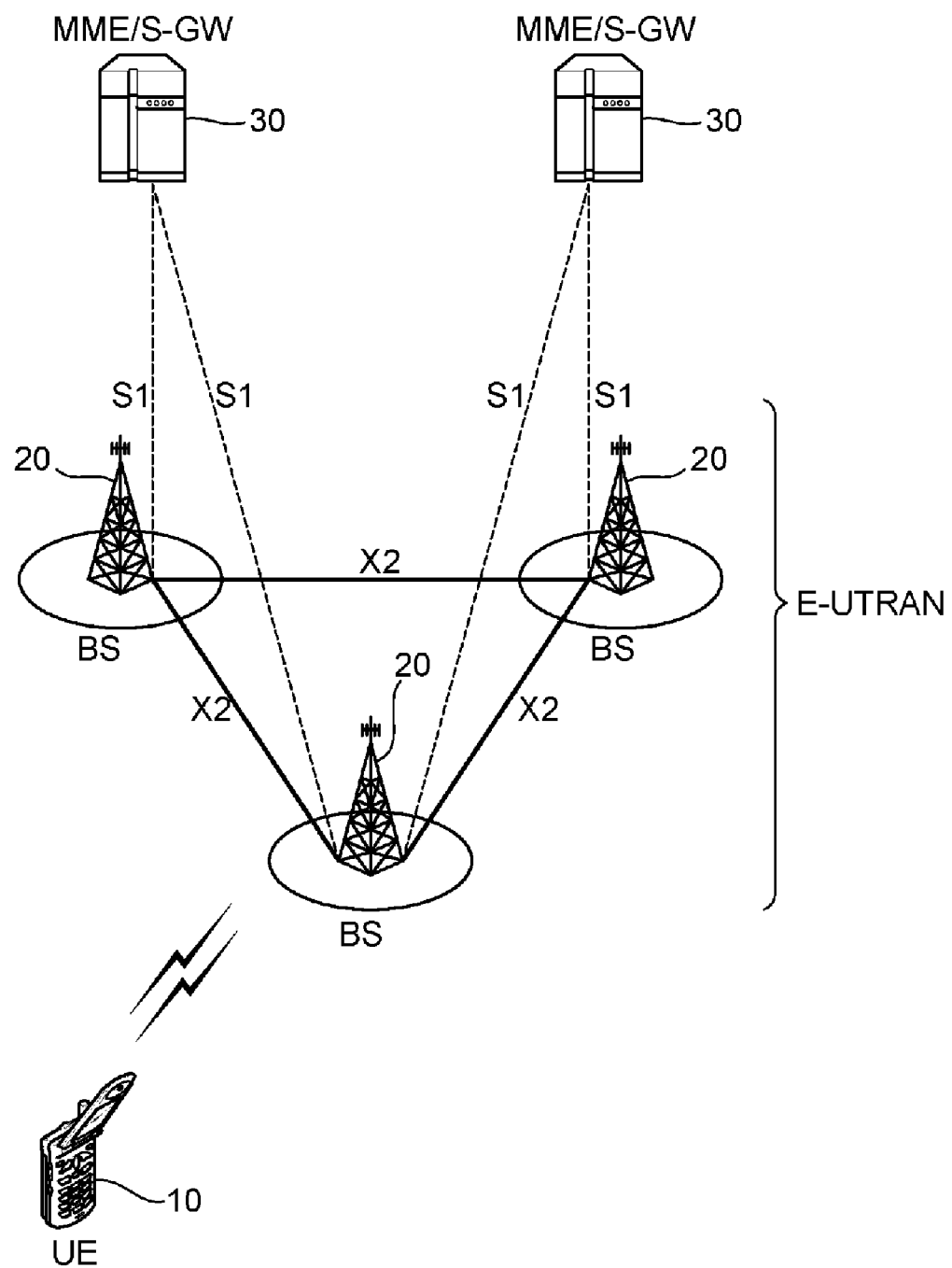

[Fig. 2]
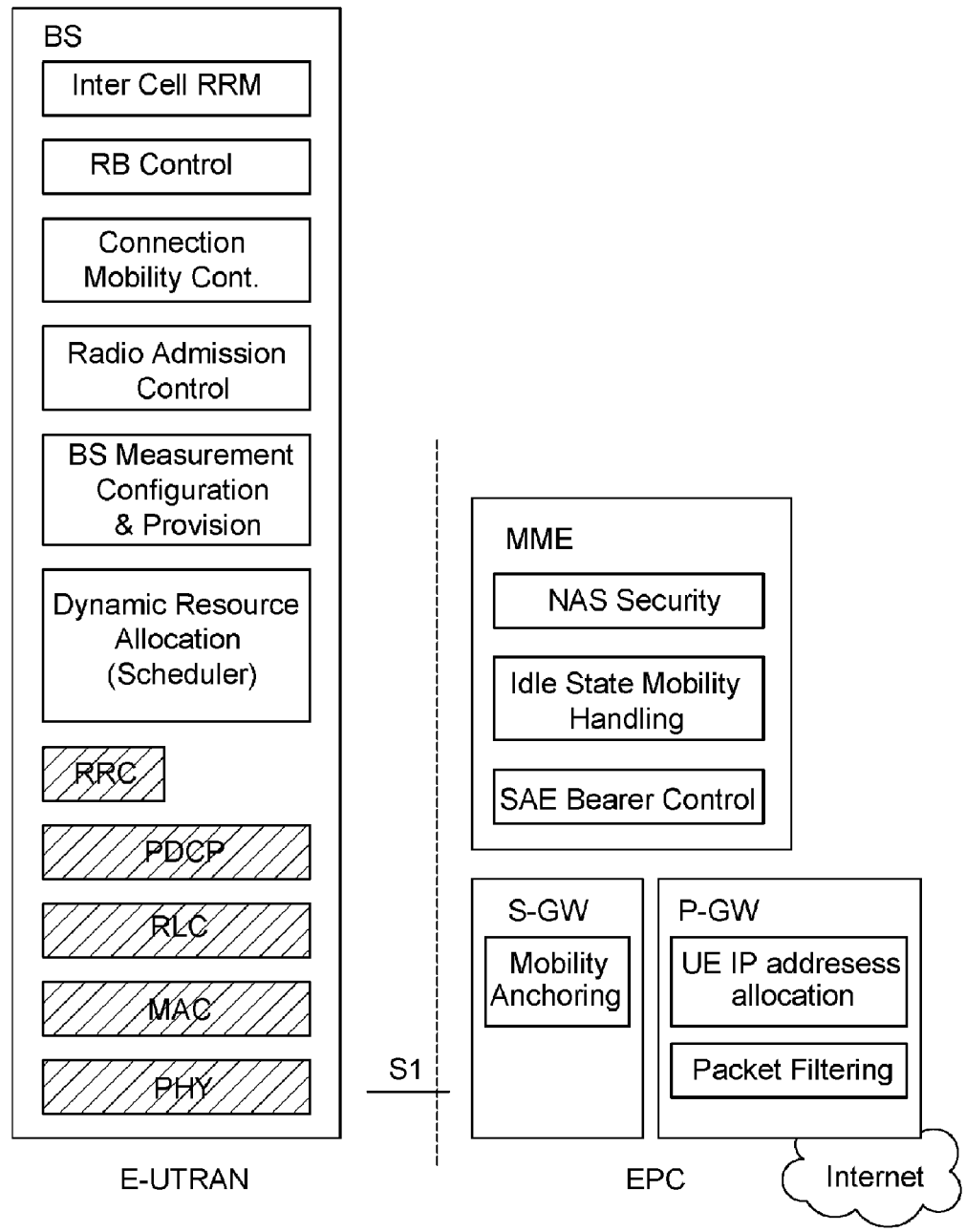

[Fig. 3]
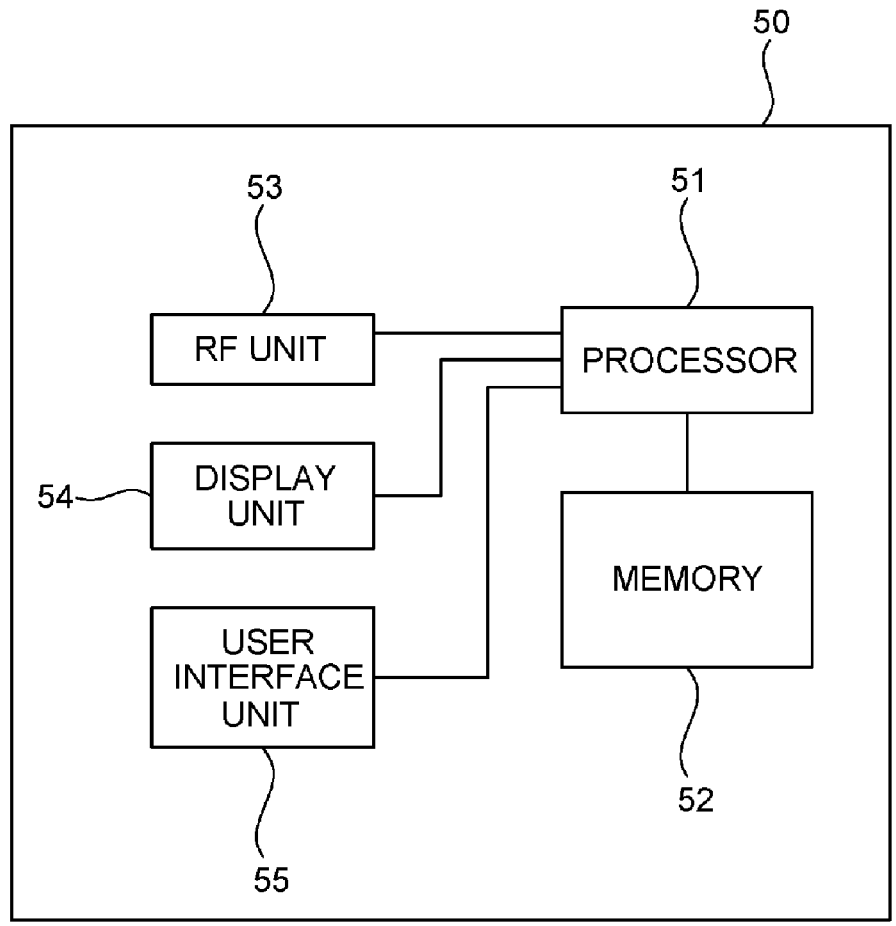
[Fig. 4]
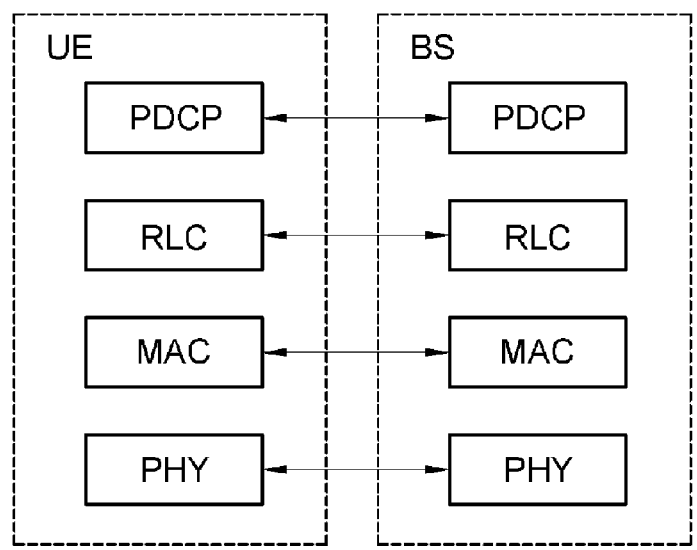

[Fig. 5]
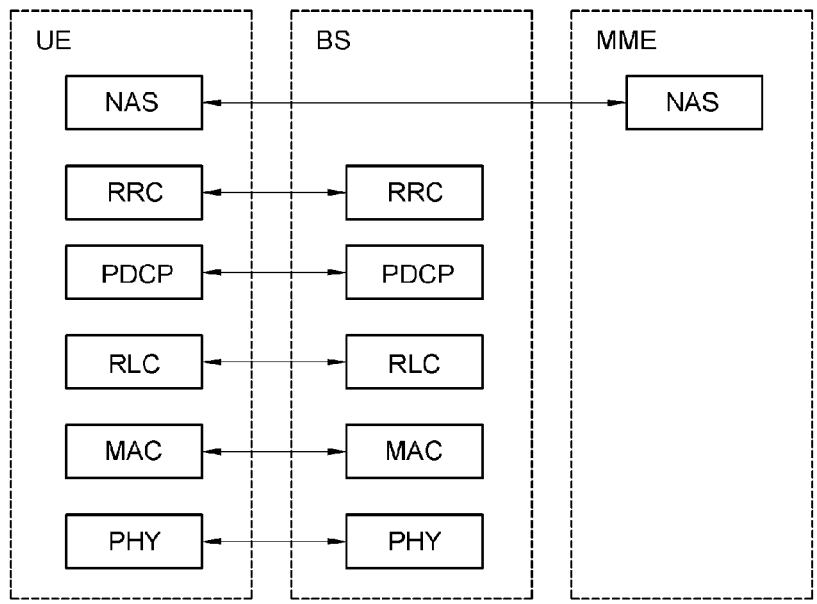
[Fig. 6]
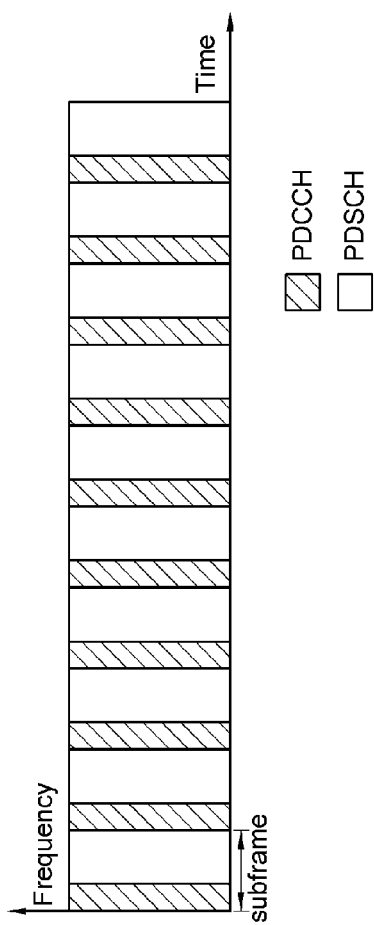

[Fig. 7]
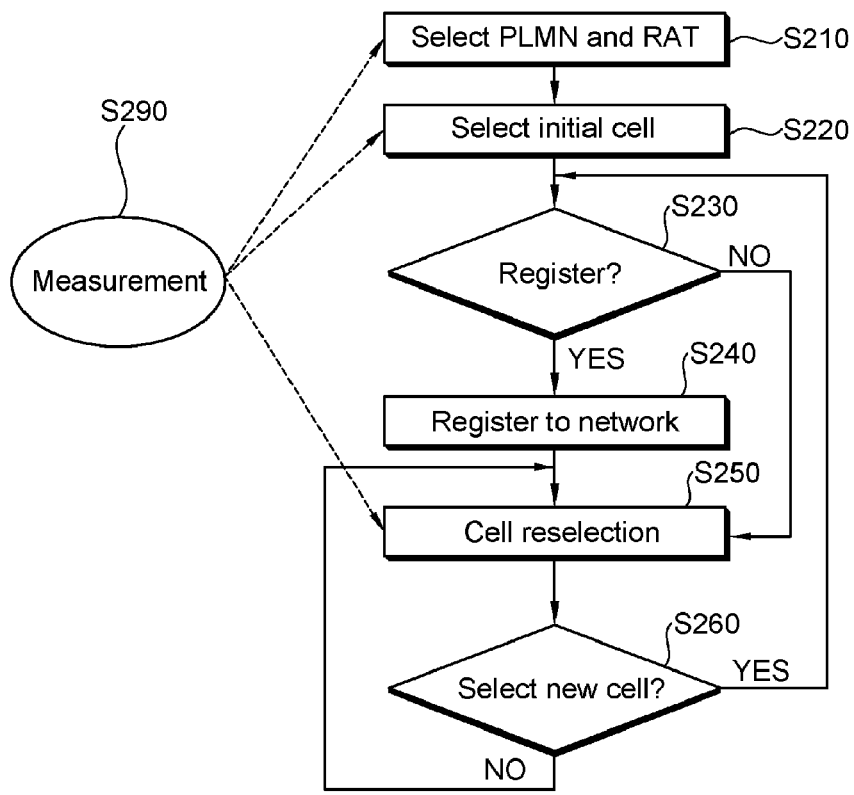
[Fig. 8]
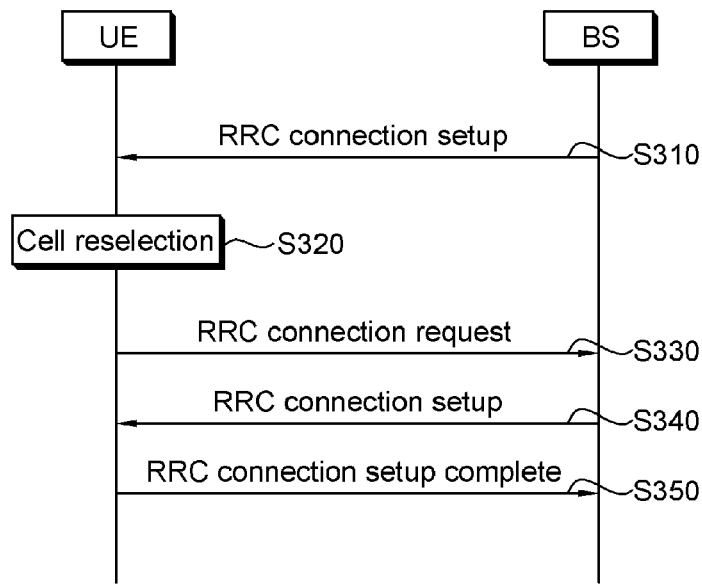

[Fig. 9]
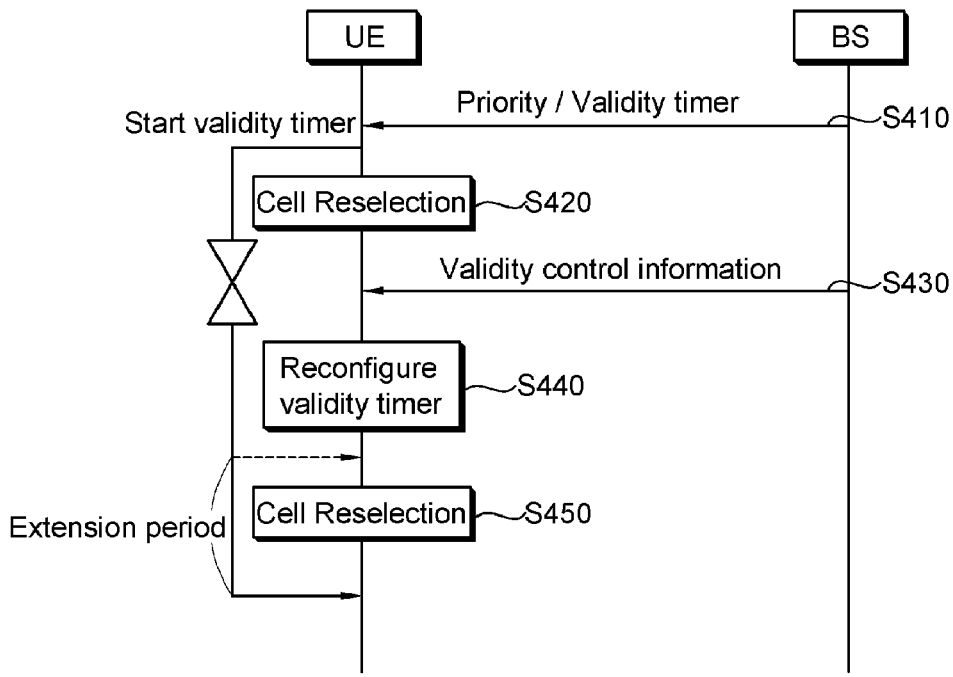
[Fig. 10]
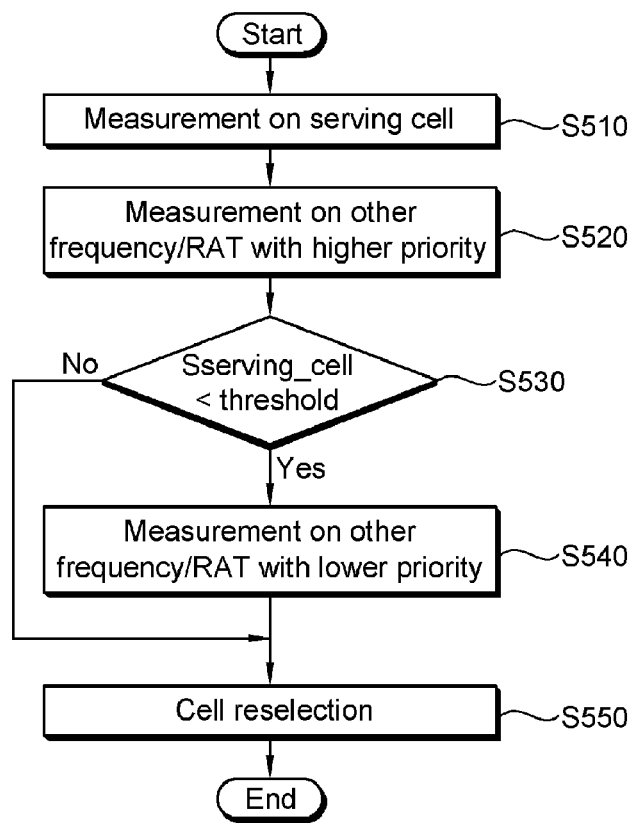

[Fig. 11]
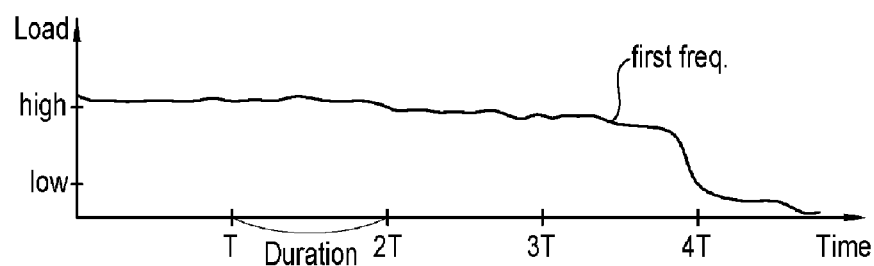
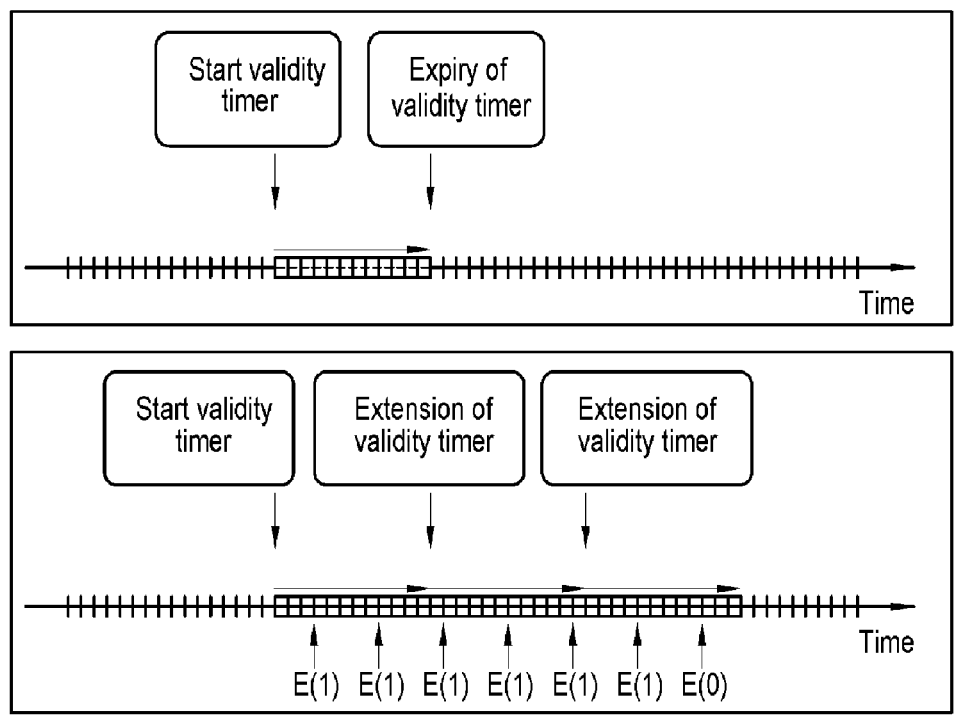

METHOD OF PERFORMING CELL RESELECTION IN WIRELESS COMMUNICATION SYSTEM

CROSS-REFERENCE TO RELATED APPLICATIONS

This application is the National Stage filing under 35 U.S.C. §371 of International Application No. PCT/KR2008/005835, filed on Oct. 2, 2008, which claims the benefit of earlier filing date and right of priority to Korean Application No. 10-2007-0127016, filed on Dec. 7, 2007, and also claims the benefit of U.S. Provisional Application Serial Nos. 60/977,763, filed on Oct. 5, 2007, and 60/988,073, filed on Nov. 14, 2007.

TECHNICAL FIELD

The present invention relates to wireless communications and, more particularly, to a method for performing cell reselection in a wireless communication system.

BACKGROUND ART

A 3rd Generation Partnership Project (3GPP) based on a Wideband Code Division Multiple Access (WCDMA) radio access technique is being extensively deployed all over the world. A High Speed Downlink Packet Access (HSDPA), which may be defined as a first evolution of the WCDMA, provides a radio access technique with a competitive edge in the mid-term future to the 3GPP. However, as requirements and expectations of users and service providers are continuously increasing and development of competitive wireless access techniques is proceeding, a new technical evolution in the 3GPP is requested to ensure competitiveness in the future. The requirements include a reduction in costs per bit, an increase in service availability, the flexible use of frequency bands, a simple structure and an open interface, proper power consumption of user equipments, or the like.

In general, cell selection may be classified into an initial cell selection performed at an initial stage after power of a user equipment is turned on and a cell reselection performed for a handover or a neighbor cell measurement.

The reason for the user equipment to perform a cell reselection is to register itself to a network to receive a service from a base station. If the strength or quality of signals between the user equipment and a serving cell is degraded due to the movement of the user equipment, the user equipment reselects a different cell to keep its transmission quality.

There may be various types of criterion to perform cell selection, and cell selection may be performed according to priority for inter-frequency or inter-RAT (Radio Access Technology). The priority may be temporarily changed due to mobility of the user equipment and various other factors. Thus, it is required to reconfigure priority over time, rather than maintaining the same priority for the same frequency or the RAT.

Besides the priority for cell selection, there may be various validity factors that may temporarily change the validity according to factors such as an environment in the wireless communication system. There is a need for a method to control effectively operations of the validity factors such as extension or release of validity.

DISCLOSURE OF INVENTION

Technical Problem

The present invention provides a method for performing cell reselection in consideration of priority of a different frequency/RAT.

The present invention also provides a method for balancing loads between cells.

Technical Solution

In an aspect, a method of performing cell reselection in a wireless communication system includes receiving priority for a different frequency or RAT (Radio Access Technology) and information on a validity timer for the priority, starting the validity timer, performing cell reselection based on the priority while the validity timer is running, receiving reconfiguration information of the validity timer, and reconfiguring the validity timer based on the reconfiguration information.

In another aspect, a user equipment includes a Radio Frequency (RF) unit for receiving a radio signal, and a processor coupled with the RF unit, configured to perform cell reselection according to priority for a different frequency or RAT based on results measured from the radio signal, and configured to start a validity timer for the priority, wherein the priority is invalidated when the validity timer expires, and reconfigure the validity timer according to validity control information.

In still another aspect, a method of configuring cell reselection in a wireless communication system includes transmitting priority for a different frequency and RAT and information on a validity timer for the priority to a user equipment so that the user equipment performs cell reselection based on the priority while the validity timer is running, and transmitting reconfiguration information of the validity timer to the user equipment.

Advantageous Effects

Load balance between cells, efficient use of radio resources and high quality services can be achieved.

BRIEF DESCRIPTION OF THE DRAWINGS

FIG. 1 is a schematic block diagram showing a wireless communication system.

FIG. 2 is a schematic block diagram showing a functional split between a E-UTRAN and an EPC.

FIG. 3 is a schematic block diagram showing elements of a user equipment.

FIG. 4 is a schematic block diagram showing a user plane of a radio interface protocol.

FIG. 5 is a schematic block diagram showing a control plane of the radio interface protocol.

FIG. 6 shows a subframe structure.

FIG. 7 is a flow chart illustrating the process of an operation of performing cell selection by a user equipment in an idle mode.

FIG. 8 is a flow chart of controlling validity of inter-frequency/inter-RAT priority information.

FIG. 9 is a flow chart of a cell reselection method according to an embodiment of the present invention.

FIG. 10 is a flow chart illustrating the process of measurement using set priority.

FIG. 11 is an exemplary view showing a method of controlling a validity timer of priority according to an embodiment of the present invention.

MODE FOR THE INVENTION

FIG. 1 is a schematic block diagram showing a wireless communication system. This may be a network structure of an Evolved-Universal Mobile Telecommunications System (E-UMTS). The E-UMTS system may be called as a Long Term Evolution (LTE) system. The wireless communication system can be widely deployed to provide a variety of communication services, such as voices, packet data, etc.

Referring to FIG. 1, an Evolved-UMTS Terrestrial Radio Access Network (E-UTRAN) includes a base station (BS) 20 that provides a control plane and a user plane. A user equipment 10 may be fixed or mobile, and may be referred to as another terminology, such as a mobile station (MS), a user terminal (UT), a subscriber station (SS), a wireless device, etc. The BS 20 generally refers to a fixed station that communicates with the UE 10 and may be called another terminology, such as an eNB(evolved-Node B), a BTS (Base Transceiver System), an access point, etc. There are one or more cells within the coverage of the BS 20. An interface may be used to transmit user traffic or control traffic between BSs 20. Hereinbelow, downlink refers to communication from the BS 20 to the UE 10, and uplink refers to communication from the UE 10 to the BS 20.

The BSs 20 may be connected with each other via an X2 interface. The BS 20 is connected with an EPC (Evolved Packet Core), specifically, to an MME (Mobility Management Entity)/S-GW (Serving Gateway) 30, via an S1 interface. The S1 interface supports many-to-many relation between the BS 20 and the MME/S-GW 30.

FIG. 2 is a schematic block diagram showing a functional split between a E-UTRAN and an EPC.

With reference to FIG. 2, shaded blocks (with oblique lines) represent radio protocol layers, and empty blocks represent functional entities of the control plane.

The BS performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and setting a measurement report.

An MME performs the following functions: (1) distribution of paging messages to BSs; (2) security control; (3) idle state mobility control; (4) SAE bearer control; (5) ciphering and integrity protection of NAS (Non-Access Stratum) signaling.

The S-GW performs the following functions: (1) termination of a user plane packet with respect to paging; and (2) user plane switching to support UE mobility.

FIG. 3 is a schematic block diagram showing elements of a UE. A UE 50 includes a processor 51, a memory 52, an RF unit 53, a display unit 54, and a user interface unit 55. The processor 51 configures to functions the layers of the radio interface protocol and provides the control plane and the user plane. Functions of the layers may be implemented via the processor 51. The memory 52 is coupled with the processor 51 and stores a driving system, an application and a general file. The display unit 54 displays various information of the UE and may be formed by using the well known elements such as an LCD (Liquid Crystal Display), an OLED (Organic Light Emitting Diode), or the like. The user interface unit 55 may be configured by combining well known user interfaces such as a keypad, a touch screen, or the like. The RF unit 53 is coupled with the processor and transmits and/or receives a radio signal.

The layers of the radio interface protocol between the UE and a network may be divided into a first layer L1, a second layer L2, and a third layer L3 based on the three lower layers of an open system interconnection (OSI) standard model widely known in communication systems. The physical layer belonging to the first layer (L1) provides an information transfer service using a physical channel, and an Radio Resource Control (RRC) layer positioned at the third layer serves to control radio resources between the UE and the network. To this end, the RRC layer exchanges an RRC message between the UE and the network.

FIG. 4 is a schematic block diagram showing the user plane of the radio interface protocol. FIG. 5 is a schematic block diagram showing the control plane of the radio interface protocol. It shows the structure of the radio interface protocol between the UE and the E-UTRAN. The user plane is a protocol stack for transmitting user data, and the control plane is a protocol stack for transmitting a control signal.

Referring to FIGS. 4 and 5, the physical layer, namely, the first layer, provides an information transfer service to an upper layer by using a physical channel. The physical layer is coupled with an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via the physical channel. The physical channel may be modulated according to an Orthogonal Frequency Division Multiplexing (OFDM) scheme, and time and frequency may be utilized as radio resources.

The MAC layer of the second layer provides a service to an Radio Link Control (RLC) layer, an upper layer, via a local channel. The RLC layer of the second supports reliable data transmission. The RLC layer includes three types of operation modes: a transparent mode (TM), an unacknowledged mode (UM), and an acknowledged mode (AM) according to a data transmission method. An AM RLC provides bi-directional data transmission service, and supports re-transmission when transmission of an RLC PDU (Protocol Data Unit) fails.

In order to effectively transmit an Internet Protocol (IP) packet such as an IPv4 or an IPv6 in a radio interface with a releatively small bandwidth, a Packet Data Convergence Protocol (PDCP) layer of the second layer performs a header compression function to reduce the header size of the IP packet that includes relatively large and unnecessary control information.

The RRC layer of the third layer is defined only at the control plane. The RRC layer serves to control a logical channel, a transport channel and a physical channel in relation to configuration, re-configuration, and releasing of radio bearers (RBs). RB refers to a service provided by the second layer for data transmission between the UE and the E-UTRAN. When there is an RRC connection between the RRC of the UE and that of the network, the UE is in an RRC-connected mode, or otherwise, the UE is in an RRC idle mode.

A Non-Access Stratum (NAS) layer positioned at an upper portion of the RRC layer performs a function such as session management, mobility management, or the like.

Downlink transport channels for transmitting data from the network to the UE includes a BCH (Broadcast Channel) for transmitting system information, a PCH (Paging Channel) for transmitting a call message, a DL-SCH (Downlink-Shared Channel) for transmitting user traffic or a control message, or the like. Traffic or a control message of a downlink multicast or broadcast service may be transmitted via the DL-SCH or via a downlink MCH (Multicast Channel). Uplink transport channels for transmitting data from the UE to the network includes an RACH (Random Access Channel) for transmitting an initial control message and a UL-SCH (Uplink-Shared Channel) for transmitting user traffic or a control message.

The BS manages radio resources of one or more cells. A single cell is set with one of 1.25, 2.5, 5, 10, 20 Mhz, etc., to provide a downlink or uplink transmission service to several UEs. In this case, different cells may be set to provide different bandwidth. Cells may be configured to overlap geographically by using several frequencies. The BS provides basic information for a network connection to the UE by using system information. The system information includes essential information for the UE to know in order to be connected to the network. Thus, the UE should receive all the system information before being connected to the BS, and constantly updates the latest system information. The system information is information all the UEs within a single cell should retain, so the BS periodically transmit the system information.

Logical channels mapped to a transport channel includes a BCCH (Broadcast Channel), a PCCH (Paging Control Channel), a CCCH (Common Control Channel), an MCCH (Multicast Control Channel), an MTCH (Multicast Traffic Channel), a DCCH (Dedicated Control Channel), or the like.

FIG. 6 shows a subframe structure.

Referring to FIG. 6, a subframe includes a plurality of OFDM symbols and a plurality of subcarriers. The subframe is a unit for allocating radio resources. The subframe includes a plurality of resource blocks, and a resource bock includes a plurality of subcarriers (e.g., twelve subcarriers). The subframe may be divided into a region to which a PDCCH (Physical Downlink Control Channel, which is also called an L1/L2 control channel) is allocated, and a region to which a PDSCH (Physical Downlink Shared Channel) is allocated. For example, three preceding OFDM symbols of the subframe may be allocated to the PDCCH. Time during which a single subframe is transmitted is called a TTI (Transmission Time Interval), and 1 TTI may be, for example, 1 ms. The subframe may be divided into two slots in time domain, so when 1 TTI is 1 ms, one slot has an interval of 0.5 ms.

A method for transmitting and receiving a paging message will now be described.

When a paging message including a paging record with a paging cause, a UE identity, or the like, is received, the UE performs a discontinuous reception (DRX) for the purpose of reducing power consumption. Namely, the network configures several paging occasions at every period called a paging cycle, and the UE acquires a paging message only at the paging occasion. The UE may not receive such a paging message at other time than the paging occasion, and may be in a sleep state in order to reduce power consumption. An interval of a single paging occasion may correspond to one TTI. The network may indicate whether or not the paging message appears by using a paging indicator as a particular value informing a transmission of the paging message. An identifier such as a P-RNTI (Paging-Radio Network Temporary Identity) or the like may be defined as the paging indicator.

The UE wakes up at every DRX period to monitor the PDCCH in a subframe to know whether or not the paging message has been transmitted. When the UE detects the PDCCH addressed by the P-RNTI, it receives the paging message on a PDSCH indicated by the PDCCH. When the paging message includes a UE identifier (e.g., an IMSI (International Mobile Subscriber Identity)) of the UE, the UE can receive a service in response to the BS.

FIG. 7 is a flow chart illustrating the process of an operation for performing cell selection by a UE in an idle mode. The purpose of performing cell selection by the UE is to register to the network to receive a service from the BS. When the strength or quality of a signal between the UE and a serving cell is degraded due to the movement of the UE, the UE reselects a different cell to maintain transmission quality of data. Hereinafter, a characteristic value of a physical signal related to the strength of a signal or an SINR (Signal-To-Interference plus Noise Ratio) or the like may be simply called a signal characteristic value. There may be a selection or reselection of a cell based on the signal characteristic value which depends on a radio environment. In performing the cell selection, the following methods may be performed according to a Radio Access Technology (RAT) of a cell and frequency characteristics.

(1) Intra-frequency cell reselection: reselection of a cell having the same RAT and the same center frequency as those of the cell in use by the UE (2) Inter-frequency cell reselection: reselection of a cell having the same RAT as that of the cell in use by the UE and a different center frequency from that of the cell in use by the UE (3) Inter-RAT cell reselection: reselection of a cell using a different RAT from that of the cell in use by the UE.

With reference to FIG. 7, in step S210, the UE selects a RAT to communicate with a PLMN (Public Land Mobile Network) from which the UE wants to receive a service. The PLMN and the RAT information may be selected by the user of the UE, or information stored in a USIM (Universal Subscriber Identity Module) may be used.

In step S220, the UE selects a cell having the best signal characteristic value as an initial cell according to a measured signal characteristic value, and then receives system information the selected cell periodically transmits.

In step S230, the UE determines whether or not registration has been made by comparing network information (e.g., a TAI (Tracking Area Identity)) received from the system information and network information that the UE has. If the network information received from the system information and the network information of its own are different, the UE performs a registration procedure to the network.

In step S240, the UE registers its information (e.g., IMSI) to receive a service from the network.

In step S250, if the signal characteristic value measured from a neighbor cell is better than that measured from the serving cell from which the UE receives a service, the UE performs cell reselection. In this case, if priority of the inter-frequency or the inter-RAT has been defined, a cell may be selected in consideration of the priority. This is called a cell reselection, discriminated from an initial cell selection.

In step S260, when a new cell is selected, the UE determines again, starting from whether or not registration has been performed.

In step S290, the UE periodically or non-periodically performs measurement for the initial cell selection or cell reselection. An RSRP (Reference Symbol Received Power), an RSRQ (Reference Symbol Received Quality), an RSSI (Received Signal Strength Indicator), or the like, may be used as the measurement result value.

In order for the UE to perform cell reselection according to the measurement result, cell reselection criterion such as a UE capability (UE capability), subscriber information, cell load balancing, traffic load balancing or the like are required.

The cell reselection according to the UE capability refers to performing cell reselection according to a selectable frequency band because an available frequency band that can be used by the UE itself may be limited. The cell reselection according to the subscriber information refers to the fact that the UE may be set to be able to select or unable to select a cell according to subscriber information or an operator policy. The cell reselection according to the cell load balancing refers to allow a smaller number of UEs to select a cell in use in order to reduce a load by data generated when the UEs in an idle mode are activated in a single cell. The cell reselection according to the traffic load balancing refers to changing a cell in terms of reducing a load according to data generated from the activated UE.

The E-UTRAN system has a high possibility of extending and operating a frequency band in an existing UTRAN for the purpose of installation/maintenance/repairing. Thus, in order to effectively use radio resources and balance an inter-cell load, it is much necessary to consider cell load balancing or traffic load balancing in a cell reselection.

In order to effectively perform a cell selection process, the UE may define priority for each frequency or each RAT to be considered in cell selection or cell reselection. This is called an inter-frequency or inter-RAT priority. In addition, if there are a plurality of frequencies/RATs, each of them may have a different priority level or the same priority level.

The criterion for determining the inter-frequency/inter-RAT priority are based on various purposes as described below, and the below purposes require a process for selecting a cell by the UE.

(1) QoS (Quality of Service) to be provided for the UE: This refers to setting priority according to QoS or types of services to be provided to the UE. For example, for a UE using only a VoIP (Voice over IP), a higher priority may be set for a particular frequency or RAT suitable for the VoIP. For another example, for a UE using a service requiring a high data rate, a higher priority may be set for the RAT (e.g., E-UTRAN) providing a high data rate. In addition, for a UE using an MBMS (Multimedia Broadcast Multicast Service), a higher priority may be set for a RAT or a frequency providing the MBMS.

(2) Network sharing: This refers to providing a service to a UE by sharing different PLMNs. In order to the UE to select a cell providing an available PLMN, a priority level for a frequency or a RAT may be determined.

(3) Subscriber type: This refers to determining a priority level according to subscriber information. For example, for a user who has subscribed to only a voice communication service requiring a low speed, a higher priority level may be set for a RAT (e.g., UTRAN) with a low speed, and a lower priority level may be set for a RAT (e.g., E-UTRAN) with a high speed. For another example, for a user who has subscribed to a multimedia service requiring a high data rate, a higher priority level may be set for the RAT (e.g., E-UTRAN) with a relatively high speed, and a lower priority level may be set for the RAT (e.g., UTRAN) with a relatively low speed.

(4) CSG (Closed Subscriber Group) cell or home BS: A CSG cell refers to a cell that can be used by one or more particular users or UEs, and a high priority level may be set for a frequency or a RAT to a particular UE that can access the CSG cell. A home BS installed in a place such as a home and used by the user may be one example of the CSG.

(5) Load balancing: Cell load balancing and traffic load balancing are included in load balancing. For example, a frequency or a RAT of a cell with a smaller load is set with a high priority level to allow the UE to preferentially select the cell with the smaller load, thereby balancing inter-cell load. In addition, load balancing can be made by cell, TA (Tracking Area), RA (Registration Area, a set of a plurality of TAs), and PLMN according to a range of a region to which priority between frequencies and RATs is applied.

(6) Operator policy: A particular frequency or RAT may have a high priority level according to a policy of an operator operating a network.

The validity and application range (scope) of the inter-frequency/inter-RAT priority information allocated to a UE may be as follows.

Validity of priority is determined by TA and the inter-frequency/inter-RAT priority is not changed before a TAU (Tracking Area Update) process. The TAU process refers to a process of registering identifier information such as an IMSI of the UE by the UE. When priority information is received from the network during or after the TAU process, the inter-frequency/inter-RAT priority are valid until the next TAU process.

Validity is determined in units of cells, and the inter-frequency/inter-RAT priority is not changed until before reselection of a different cell. For example, when priority information is received from the network during or after the cell reselection process, the inter-frequency/inter-RAT priority is valid until a next cell is reselected or until new priority information is received after a cell reselection.

Besides the TA unit or cell unit, validity or an application range such as a PLMN unit may be provided.

Validity or an application range such as an RPLMN (Registered PLMN) registered by the UE may be provided.

Priority may be invalidated due to a change in the state of the UE from an RRC idle mode to an RRC-connected mode. Priority may be invalidated according to a particular RRC message that the UE changes from the RRC idle mode to the RRC-connected mode. For example, when the UE transmits an RRC connection request message, priority may be invalidated when an RRC connection setup message is received from the BS or when an RRC connection complete message is transmitted to the BS. Conversely, priority information may be invalidated due to a change in the state of the UE from the RRC-connected mode to the RRC idle mode. For example, priority may be invalidated according to reception of an RRC connection release message.

The frequency and/or RAT information and the inter-frequency/inter-RAT priority information may be received from the BS as follows.

(1) The UE receives selectable frequency and/or RAT information from the BS in the process of TAU. The UE receives inter-frequency/inter-RAT priority information as a portion of system information.

(2) The UE receives inter-frequency/inter-RAT priority information as a part of system information.

(3) The UE receives selectable frequency and/or RAT information from the BS in the process of TAU. And the UE receives inter-frequency/inter-RAT priority information corresponding to each frequency and RAT.

(4) The inter-frequency/inter-RAT priority information may be received together with information about a frequency and/or a RAT through an RRC message. The RRC message may be at least one of an RRC connection release/connection request/connection setup message, a radio bearer setup message, a radio bearer reconfiguration message, an RRC connection reconfiguration message, and an RRC connection reestablishment message.

(5) Frequency and/or RAT information are received via L1/L2 control signaling, and PDCP/RLC/MAC PDU. And inter-frequency/inter-RAT priority information of each frequency/RAT may be received.

Besides the method of receiving the frequency and/or RAT information from the BS and the method of receiving priority, frequency and or RAT information stored in an SIM/USIM card may be fetched, or priority information corresponding to each frequency and each RAT may be fetched.

The method for acquiring frequency and/or RAT information by the UE and the priority information acquiring method are not limited to one method but can be combined to be applied.

The UE may receive the inter-frequency/inter-RAT priority from the network according to at least one of the methods as mentioned above, and inter-frequency/inter-RAT priorities received according to different methods may be the same or different. If the UE repeatedly receives priority information according to different methods, the UE may preferentially apply a second priority level rather than a first priority level arbitrarily or according to a designated method. For example, when the UE receives the first priority information through system information and then receives the second priority information through the RRC connection release message, the UE may perform measurement and cell reselection according to the second priority information, disregarding the first priority information. Thereafter, the UE may be establish an RRC connection with the BS in order to be changed from an RRC idle mode to an RRC-connected mode to receive a service from the BS, and in this process, the UE may invalidate the second priority information that has been previously received from the RRC connection release message. If the UE fails to receive priority information from the network in RRC connection release, it may return to the RRC idle mode and perform cell reselection based on previous priority information or priority information received as a part of the system information.

The UE may know the presence of each frequency or RAT from an NCL (Neighbor Cell List) received through the system information, and applies allocated priority with respect to the present frequency or RAT in cell reselection. Without the NCL, the UE may detect whether or not frequency or RAT exists through a process of searching a different frequency or RAT by the UE itself.

In addition, in order to determine validity of priority transferred to the UE, the network may have a validity timer which defines the validity of the priority. The network may transfer information about the validity timer to the UE according to one or more of the priority transferring methods. The priority transferred by the network to the UE may be valid only while the validity UE is running, and the UE performs an operation according to priority (e.g., measurement, cell reselection according to priority, etc.). When the validity timer expires, the UE may read priority information provided from the system information. For example, when the UE receives priority information and a validity timer value (e.g., 100 seconds) through the RRC connection release message, the UE initiates the validity timer at a particular time point and performs cell reselection according to the priority received from the system information. A point of time at which the validity timer is initiated may be a value implicitly determined between the UE and the BS, or may be explicitly determined by one of the BS and the UE and informed to the other.

The purpose of configuring the validity timer for the inter-frequency/inter-RAT priority obtained through the NAS message (e.g., TAU (Tracking Area Update) message) or the RRC message is allowing the UE to select a cell of a particular frequency or RAT and receive a service while the validity timer is running. For example, the network sets a frequency or RAT with a small load with high priority and transfers the validity timer value to allow the UE to receive a service at the frequency or RAT with the small load for the reason of temporarily load balancing.

FIG. 8 is a flow chart of controlling validity of inter-frequency/inter-RAT priority information.

With reference to FIG. 8, in step S310, when the UE receives an RRC connection release message from the BS, it enters the RRC idle mode. The RRC connection release message instructs release of an RRC connection and includes inter-frequency/inter-RAT priority information and a validity timer value.

In step S320, the UE initiates the validity timer and performs cell reselection based on the inter-frequency/inter-RAT priority.

In step S330, the UE transmits an RRC connection request message to the BS to request an RRC connection. In step S340, the BS transmits an RRC connection setup message to the UE in response to the RRC connection request. Upon receiving the RRC connection setup message, the UE discards the inter-frequency/inter-RAT priority information, and if the validity timer is running, the UE stops the validity timer. In step S350, when the UE transmits an RRC connection setup complete message to the BS, the RRC connection is completed.

While the validity timer is running, the UE may perform cell reselection for a frequency or RAT with higher priority among priorities associated with the validity timer. When the validity timer expires, the UE may perform cell reselection based on new priority information or a previous priority level, or may perform cell reselection regardless of priority. The purpose of using the validity timer is for load balancing. However, when the timer expires, it is difficult to consider the load of a current cell according to the operation of the UE. For example, a serving cell may determine the value of the validity timer in consideration of a traffic state. However, the serving cell cannot adjust the value of the validity timer by any other method than the RRC connection release message. Priority information transferred as a portion of the system information is applied to every UE within a cell, so it is difficult to differently apply the priority of a frequency or RAT in units of particular UEs. Thus, when the validity timer expires, it is difficult to induce a particular UE to reselect a cell of a frequency or RAT with a particular priority level.

If the load of a particular frequency or RAT is high even when the validity timer expires, it would be better for the UE to select a cell with a smaller load than a cell with a larger load. However, when the validity timer expires, the priority information used in conjunction with the validity timer is invalidated, so the UE has no choice but to perform cell reselection based on priority provided from the system information or a previous priority level (e.g., the priority level allocated in the TAU process or the priority level stored in the USIM card, etc.). Thus, the UE may rather select a cell with a larger load even after the validity timer expires. When the UE requests an RRC connection to a cell with a larger load, the BS connects the user request to a different cell with a smaller load, generating RRC connection redirection that makes the UE receive a service in the cell with a smaller load, resultantly causing a service delay. In addition, although the BS provides a service from a cell with a larger load without redirecting the RRC connection, the bandwidth provided to the UE is inevitably limited. Thus, ii is difficult to effectively use radio resources, and QoS may be degraded.

FIG. 9 is a flow chart of a cell reselection method according to an embodiment of the present invention.

With reference to FIG. 9, in step S410, the BS transmits inter-frequency/inter-RAT priority and information on configuration of the validity timer to the UE.

In step S420, the UE startss the validity timer and performs cell reselection process through the inter-frequency/inter-RAT priority.

In step S430, the BS transmits validity control information to the UE. The validity control information is information for controlling validity of priority which includes information on extension of the validity timer.

In step S440, the UE reconfiguress the validity timer according to the validity control information. Thus, the validity timer continuously extends although an existing valid time lapses.

In step S450, the UE performs cell reselection based on the inter-frequency/inter-RAT priority.

FIG. 10 shows a flow chart illustrating the process of measurement using set priority.

With reference to FIG. 10, in step S510, the UE measures a signal of the serving cell.

In step S520, the UE performs measurement on different frequency/RAT with a priority higher than that of the serving cell.

In step S530, the UE compares the measurement result ($S_{serving\_cell}$) of the serving cell with a threshold value. If the measurement result of the serving cell is lower than the threshold value, the UE does not perform measurement on different frequency/RAT with a lower priority.

In step S540, if the measurement result of the serving cell is lower than the threshold value, the UE performs measurement on different frequency/RAT with a lower priority.

In step S550, the UE performs cell reselection based on the measurement result and the priority.

If priority is defined between different frequencies or different RATs, the UE performs measurement on a cell corresponding to the frequency or RAT with high priority within a range satisfying a signal characteristic value defined in the system. Exceptionally, the UE may select a cell with the highest signal characteristic value without consideration of the priority defined in the frequency or RAT in an initial cell selection.

If the measurement result of the serving cell is higher than the threshold value, the UE does not perform measurement on other frequency/RAT with lower priority, so power consumption that may be otherwise caused by measurement can be reduced.

If several cells satisfy the signal characteristic value as a target for a cell reselection, the UE may select a cell by using one or more signal characteristic value, priority, and the like, such as a cell with the highest priority level, a cell with the best signal characteristics, a cell with more than a particular signal characteristic value and with the highest priority level, a cell with a priority level higher than a particular value and with the highest signal characteristic value, or the like.

If the UE cannot receive a service from a cell of a frequency or RAT with the highest priority level, namely, when the UE selects a cell of a frequency or RAT with a low priority level, the UE periodically searches the cell of the frequency or the RAT with high priority level. Here, the period at which other cell is searched may be a value previously determined between the BS and the UE, or may be explicitly determined by one of the BS and the UE and informed to the other.

If a signal characteristic value of a cell as a target for cell reselection satisfies certain conditions for a certain time period, cell reselection is performed. In addition, if a signal characteristic value of the serving cell does not satisfy the certain conditions but a signal characteristic value of a cell as a target for cell reselection satisfies certain conditions for a certain time period, cell reselection is performed.

The validity control information will now be described.

The validity control information is used to define validity for a validity target (e.g., priority) defined between the BS and the UE in a control target (e.g., a timer or a counter, etc), and control the validity. In specifying the validity between the BS and the UE, the validity may be implicitly defined between the BS and the UE, or explicitly informed to one of the BS and the UE by the other.

In order to control validity periodically or non-periodically, the BS may transmit a control target (e.g., timer), a controlling operation (e.g., extending) of the control target, and a factor value required for the controlling operation to the UE. The factor value required for the controlling operation is called a control value. The UE performs controlling operation with the control value with respect to the control target.

In order to control the validity of a validity target of the UE periodically or non-periodically, the BS may transmit a validity target (e.g., priority) along with a control target (e.g., timer), a controlling operation (e.g., extending) of the control target, and the control value.

Even if the BS does not specify a control target, the UE can discriminate the control target by using the controlling operation and/or the control value. Even if the BS informs the UE about only one of the control target, the controlling operation, and the control value, the UE can implicitly know the other remaining values.

Even if the BS informs the UE about only one of the control target, the controlling operation, and the control value, the UE can discriminate a validity target to which the control information is applied. The UE may discriminate the validity target to which the control information is applied by a method according to which the BS transfers the control information to the UE.

The UE may know the validity target, the control target, the controlling operation, the control value, or the like, according to system definition by a particular event. The types of events may be a time point at which the signal characteristic value of the serving cell becomes higher or lower than a particular threshold value, a time point at which a cell reselection is performed according to priority or the signal characteristic value, a time point at which a particular RRC message (e.g., RRC connection reconfiguration failure message) is transmitted or received, or the like. For example, the UE may reselect other cell having the same priority level as that of the serving cell and perform an operation of controlling validity of the priority.

Hereinafter, the above-mentioned control target, the controlling operation, and the control value will be collectively called validity control information.

The control target of the validity control information includes a timer and a counter. The timer may be used as a method indicating a validity term of the validity target. While the timer is running, a validity target associated with the timer is determined to be valid, and when the timer expires, the validity target is determined not to be valid. A default expiry time of the timer may be a value implicitly defined between the UE and the BS, or may be a value determined by one of the UE and the BS and informed to the other. As the control value for the timer, (1) a value indicating an expiry term of the timer and/or (2) the number of times of operating the timer may be used.

The counter may be used as a method for indicating a valid degree of the validity target. If the counter value is larger than a particular value (e.g., 0), it is determined that a validity target associated with the counter is valid, and if the counter value is not larger than the particular value (e.g., 0), it is determined that the validity target is not valid. Alternatively, if the counter value is not larger than a particular value (e.g., 10), it is determined that the validity target is valid, and if the counter value is larger than 10, it is determined that the validity target is not valid. An initial value of the counter and the particular value may be a value implicitly determined between the UE and the BS, or may be a value determined by one of the UE and the BS and explicitly informed to the other. As a control value for the counter, (1) the initial value of the counter, (2) a value indicating the size of the counter to be increased and decreased, (3) a value indicating an increase/decrease unit of the counter, and (4) a value indicating the expiry number of times of a particular timer when the UE is used together with the timer, may be used.

In order to transfer the validity control information, the following methods may be used.

(1) System information: Validity control information is transmitted as a part of system information.

(2) Paging: Validity control information may be transmitted to the UE through a paging message. Namely, like the paging record including a paging reason and a UE identifier, validity control information is included in the paging message and transmitted to the UE. When the paging record is included in the paging message, the UE performs a general paging procedure according to the paging record information, and if there exists validity control information, the UE performs a corresponding operation. If the paging message includes both the paging record and the validity control information, whether to perform both operations or whether to perform only one of them according to each information may be defined by the system. The paging record may include the validity control information. If both the paging record and the validity control information exist, only a particular UE may perform an operation according to the validity control information according to a UE identifier included in the paging record.

(3) L1/L2 control channel: The validity control information may be transmitted via a channel that transfers control information such as a PDCCH. One example of a particular value indicating the validity control information may be an identity value according to whether or not a change is instructed and a change rule. As the identity value, an RNTI indicating a controlling operation and a control value of a control target such as a PI-RNTI indicating the presence of a paging message may be defined to be used. Accordingly, a plurality of RNTIs may be defined according to the validity control information.

(4) RRC signaling: The validity control information may be transmitted through RRC signals such as a radio bearer setup-associated message, a radio bearer reconfiguration-associated message, an RRC connection request/connection setup/connection release-associated message, an RRC connection reconfiguration-associated message, an RRC connection re-establishment-associated message, and the like.

(5) NAS signaling: The validity control information may be transmitted via the NAS signal such as the message in the TAU process.

(6) The validity control information may be transmitted through PDUs such as the RLC, the MAC, the PDCP, or the like, and it can be transferred according to every signaling procedures of the BS and the UE.

Controlling operations of the validity control information may include the followings:

(1) Extension: It refers to extending an expiry term of the validity of a control target. When the BS transfers a control value indicating extension of a valid time of a particular value to the UE, the UE applies the control value to a valid value of a control target. Because the extending operation may be used to indicate sustaining of the validity, it may be also called a sustaining operation. For example, if there are priority information of a frequency or RAT and a validity timer and if the BS transmits a control value instructing that the validity timer should be operated one more time together with a controlling operation of extending the validity timer, the UE runs the validity timer again when the validity timer expires.

(2) Pause: It refers to pausing the operation of a control target. For example, if there are priority information of a frequency/RAT and the validity timer and if an expiry term of the timer is 100 seconds and validity control information regarding a pausing operation is received 40 seconds after the timer is driven, the UE pauses the timer. Accordingly, 60 seconds remain till the expiry time of the timer, and in this state, if validity control information regarding resuming is received later, the UE runs the timer for 60 seconds, the remaining expiry time period. After the UE stops the timer, whether the priority information is valid or not until the timer is resumed may follow a reference determined implicitly or explicitly between the BS and the UE.

(3) Resume: It refers to resume a control target whose operation has been paused.

(4) Release: It refers to releasing the operation of the control target. Thus, the validity of a validity target associated with the control target disappears.

(5) Modify: While the extension extends the validity without changing an attribute of the control target, a modifying operation changes the attribute of the control target. For example, if the control target is a timer, a running expiry time may be changed (e.g., if 60 seconds of expiry time remains for a 100-second timer, the remaining expiry time is changed to 100 seconds), or a default expiry term of the timer may be changed (e.g., a timer with the term of 100 seconds is changed to a timer with the term of 200 seconds). In case of a counter, a running counter value may be changed (e.g., if the counter value is reduced from 10 to 6, the counter value is changed to 15), or an initial counter value may be changed (e.g., an initial value 10 is changed to 20).

(6) Re-start: A current operation of a control target is released, and the control target starts operating again from the beginning.

A particular time point at which the UE receives the validity control information and applies an operation according to the validity control information varies according to a method of transferring the validity control information, a validity target associated with the validity control information, or content of the validity control information, namely, a control target, a controlling operation, and a control value.

For example, a time point at which the UE receives the validity control information may be a time point at which the validity control information is applied. Alternatively, if the timer is a control target, a time point at which the timer expires may be a time point at which the validity control information is applied. If the counter is a control target, a time point at which the counter reaches a particular value (e.g., 0) may be a particular time point at which the validity control information is applied. The validity control information may be applied according to a particular event occurring incidentally due to an increase/decrease of a signal characteristic value of a serving cell to be larger or smaller than a particular threshold value, cell reselection according to priority or a signal characteristic value, driving and expiry of a particular timer used by the UE, and transmission/reception of a particular RRC signal (e.g., RRC connection reconfiguration failure), or the like.

The UE may receive a plurality of validity control information. For example, if a time point at which the timer expires corresponds to a time point at which the validity control information is applied, the UE may receive a plurality of validity control information through a plurality of paging messages while the timer is running and until before it expires. The plurality of validity control information may be applied according to the following method.

In one embodiment, only validity control information immediately after the timer runs or immediately before the timer expires is applied.

In another embodiment, among all the validity control information received until the timer expires after it is started, if the types of validity targets related to a control target are the same and the same controlling operation is performed on the same control target, the control values are all added and applied when the timer expires. For example, if the UE receives paging messages indicating extension while the timer with respect to priority is running, five times, the UE operates the timer five more times when the timer expires.

In still another embodiment, among all the validity control information received until the timer expires after it is started, if the types of validity targets related to a control target are the same and the same controlling operation is performed on the same control target, a value satisfying particular conditions among control values is applied when the timer expires. For example, in case of conditions of a largest value, if the UE receives paging messages indicating extension while the timer with respect to priority is running, three times, and if control values indicate four times of extension of the timer, two times of extension of the timer, and one time of extension of the timer, respectively, the UE operates the timer four more times when the timer expires.

In still another embodiment, different weight values are applied to each of a control target, a control operation, and a control value among the validity control information received until the timer expires after being driven. For example, if a weight value of a controlling operation of release is higher than that of extension, the validity control information related to the controlling operation of release is applied.

In still another embodiment, among the validity control information received until the timer expires after being driven, if the types of validity targets related to a control target are different or only some of them are the same, validity control information is separately applied according to the respective validity targets.

The time point at which the UE applies the validity control information and the method for applying a plurality of validity control information may be determined implicitly between the BS and the UE or may be determined explicitly by one of the BS and the UE and informed to the other.

The UE performs an operation of extending/stopping/resuming/releasing/modifying/re-starting according to the validity control information, namely, on the control target according to a control value. While control operation information for extending a validity time with respect to the validity timer is received while the validity timer is being driven, the UE may operates the timer again at the time point when the controlling operation information is received, or may drive the timer again when the timer expires. In addition, if a value clarifying the extension term or the extension number of the validity timer is defined as a control value, the term of the timer may be set as long as the term of extension, according to which the time may be driven. If the number of times is clarified, the number of times of driving the timer may be increased to extend the validity.

When the BS sets priority for frequencies or RATs through an RRC signal or a NAS signal and transfers the validity timer to one or a plurality of UEs for a particular purpose (e.g., load balancing between cells of different frequencies or RATs), the BS may transfer validity control information to extend a validity time.

For example, the validity control information may be transferred through system information as follows. It is assumed that the BS transfers a value informing an extension of a validity time of priority to the UE through system information. Validity control information indicating an extension of a timer may be clarified by using one or a plurality of bits. It is assumed that, if the validity control information value is 1, it means to extend validity time of priority by operating the timer indicating the validity time of the priority one or more after the timer expires. The validity control information value 1 transmitted as system information is used as a control value indicating the control target as the timer, the controlling operation as extension, and one time of extension of the timer. Because the system information includes information indicating a continuous operation, the timer is continuously operated. Conversely, it is assumed that, if a particular value indicating control information is 0, it means that there is no need to extend the validity time of priority. When the validity time of priority expires, the UE determines that priority information provided through the RRC signal or the NAS signal is not valid.

For example, transferring of the validity control information through a paging message is as follows. It is assumed that the BS transfers a value indicating sustaining or extending a validity time of a priority value to the UE through a paging process. 'Priority=1' may be clarified in the paging message, apart from paging record information, in order to indicate extending a validity time of a validity target to which the validity control information is applied. In this case, '1' may be used as a control value indicating a control target as a timer, a controlling operation as extension, and one time of extension of the timer. In detail, there are two fields including one or more bits used as validity control information, separately from the paging record, in the paging message. One of the fields indicates a type of the validity target of the UE to which the validity control information is applied, and the other indicates the validity control information. In a different method, the validity control information indicating extending of the timer may be clarified by using one or a plurality of bits in the paging message.

Besides the method of transferring the validity control information using the system information or the paging message, the validity control information may be transferred in various manners, and the present invention is not limited. A plurality of transferring methods may be combined to be used.

FIG. 11 is an exemplary view showing a method of controlling the validity timer of priority according to an embodiment of the present invention.

With reference to FIG. 11, the UE is allocated priority information of a frequency or a RAT and a validity timer indicating a validity term of the priority information through an RRC message (e.g., an RRC connection release message) during a time (T). If there are two frequencies, it is assumed that the first frequency has a large load and the second frequency has a small load during the time (T). Accordingly, the BS configures the first frequency with a lower priority level because the first frequency has the large load, and configures the second frequency with a higher priority level. The UE is allocated information regarding the priority of the first frequency, the priority level of the second frequency, and the validity timer with a particular value (e.g., 100 seconds) from the BS.

While the validity timer is running, the UE preferentially may select a cell corresponding to the second frequency according to the priority levels of the frequencies allocated by the BS, for load balancing between cells.

However, after a time point (i.e., 2T) at which the validity timer expires, the UE may determine that the priority levels allocated from the existing RRC signal are not valid, and select a cell according to a priority level received from system information or select a cell without priority. In this case, the UE may still select the cell of the first frequency with the large load. After selecting the cell of the first frequency with the large load, the UE transmits an RRC connection request to the BS after the time 2T. If the BS redirects the RRC connection request to make the UE receive a service in a cell with a small load, delay with respect to the RRC connection request would occur, causing a service delay. Or, even if the BS provides the service in the cell with a large load without redirecting the RRC connection request of the UE, efficiency of radio resources would deteriorate because load balancing is not effectively made between cells.

The use of the validity control information can prevent such a problem. The BS may determine that the load of the first frequency would be still high even after the particular time point (e.g., 2T) and extend the validity of priority until the load of the first frequency is reduced.

When the control value indicating the extension is 1 bit, if the control value is '1' (indicated as E(1) in FIG. 11), it means extension. If the control value is '0' (indicated as E(0) in FIG. 11) or if the BS does not transfer the validity control information, the UE determines that the priority information received through the RRC signal is not valid when the validity timer expires at a particular time (e.g., 4T). Accordingly, the BS can extend the validity of the priority information set for a particular UE or a plurality of UEs until the time point at which the load of the first frequency is reduced, so the load balancing can be made between cells.

The validity target to which the validity control information is applied may be various types of parameters used between the UE and the BS as well as the priority levels of cells.

For example, in order to avoid a collision that may be possibly generated during an initial random access process for the UE to request resources from the BS, the UE may be allocated a dedicated random access preamble from the BS. The UE, which attempts the random access by using the dedicated random access preamble, can request resources from the BS without contention with other UEs, so delay of resource allocation caused by a delay in a random access can be prevented. In order to allow the UE to perform a non-contention-based random access process, the BS allocates the dedicated random access preamble to the UE. In addition, the BS may set an end time indicating expiry of the validity of the dedicated random access preamble. The end time may become a validity target.

During a handover process, the UE is allocated the dedicated random access preamble and a validity end time of the dedicated random access preamble through a handover command message from a source BS. The validity end time of the dedicated random access preamble is set to be as long as estimated until the UE completes its connection to a target BS after the handover command.

Upon receiving the handover command, the UE performs a synchronization process with the target BS, requests resource allocation by using the dedicated random access preamble, and transmits a handover confirm message with resource which has been allocated from the target BS, to the BS, thus complete the handover procedure. If handover delay (or failure) occurs, for example, if the UE is not properly synchronized with the target BS, the validity of the dedicated random access preamble may expire so the dedicated random access preamble may not be used any longer. In this case, a contention-based random access process may be performed.

Thus, when the handover delay or failure occurs, the validity of the dedicated random access preamble may be extended through validity control information, whereby the non-contention-based random access process can be continuously performed.

The present invention may be implemented by hardware, software, or their combinations. In implementing hardware, the hardware may be implemented by an ASIC (Application Specific Integrated Circuit), a DSP (Digital Signal Processor), a PLD (Programmable Logic Device), an FPGA (Field Programmable Gate Array), a processor, a controller, a microprocessor, an electronic unit designed to perform the above-described functions, or their combinations. In implementing software, the software may be implemented by modules that perform the above-described functions. The software may be stored in a memory unit and executed by a processor. As the memory unit and the processor, various units well known to the person in the art may be employed.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

The invention claimed is:

1. A method of cell reselection performed by a user equipment (UE) in a wireless communication system, the method comprising:

receiving first priority information for a different frequency or a Radio Access Technology (RAT);

receiving second priority information for the different frequency or the RAT;

receiving information related to a validity timer which indicates a valid duration for the second priority information;

starting the validity timer;

performing cell reselection based on the second priority information while the validity timer is running;

receiving validity control information for an extension of the validity timer;

extending the running of the validity timer based on the validity control information;

performing cell reselection based on the second priority information while the extended validity timer is running; and performing cell reselection based on the first priority information when the extended validity timer expires, wherein:

the first priority information is applied to all UE in a cell; and the second priority information is applied to the UE.

2. The method of claim 1, wherein the second priority information and the information related to the validity timer are received via a Radio Resource Control (RRC) connection release message.

3. The method of claim 1, wherein the validity control information is received via a paging message.

4. The method of claim 1, wherein the validity timer expires when a Radio Resource Control (RRC) connection setup message is received.

5. The method of claim 1, wherein the second priority information is invalidated when the validity timer expires.

6. The method of claim 1, wherein the first priority information is received via system information.

7. A user equipment (UE) comprising:
- a Radio Frequency (RF) unit configured for receiving a radio signal; and
- a processor coupled with the RF unit and configured for:
  - receiving first priority information for a different frequency or a Radio Access Technology (RAT);
  - receiving second priority information for the different frequency or the RAT;
  - receiving information related to a validity timer for the second priority information;
  - starting the validity timer;
  - performing cell reselection based on the second priority information while the validity timer is running;
  - receiving validity control information for an extension of the validity timer;
  - extending the validity timer based on the validity control information;
  - performing cell reselection based on the second priority information while the extended validity timer is running; and
  - performing cell reselection based on the first priority information when the extended validity timer expires, wherein:
- the first priority information is applied to all UE in a cell; and
- the second priority information is applied to the UE.

8. The UE of claim 7, wherein the second priority information and the information related to the validity timer are received via a Radio Resource Control (RRC) connection release message.

9. The UE of claim 7, wherein the validity control information is received via a paging message.

10. The UE of claim 7, wherein the validity timer expires when a Radio Resource Control (RRC) connection setup message is received.

11. The UE of claim 7, wherein the second priority information is invalidated when the validity timer expires.

12. The UE of claim 7, wherein the first priority information is received via system information.

* * * * *